Figures 1, 2:
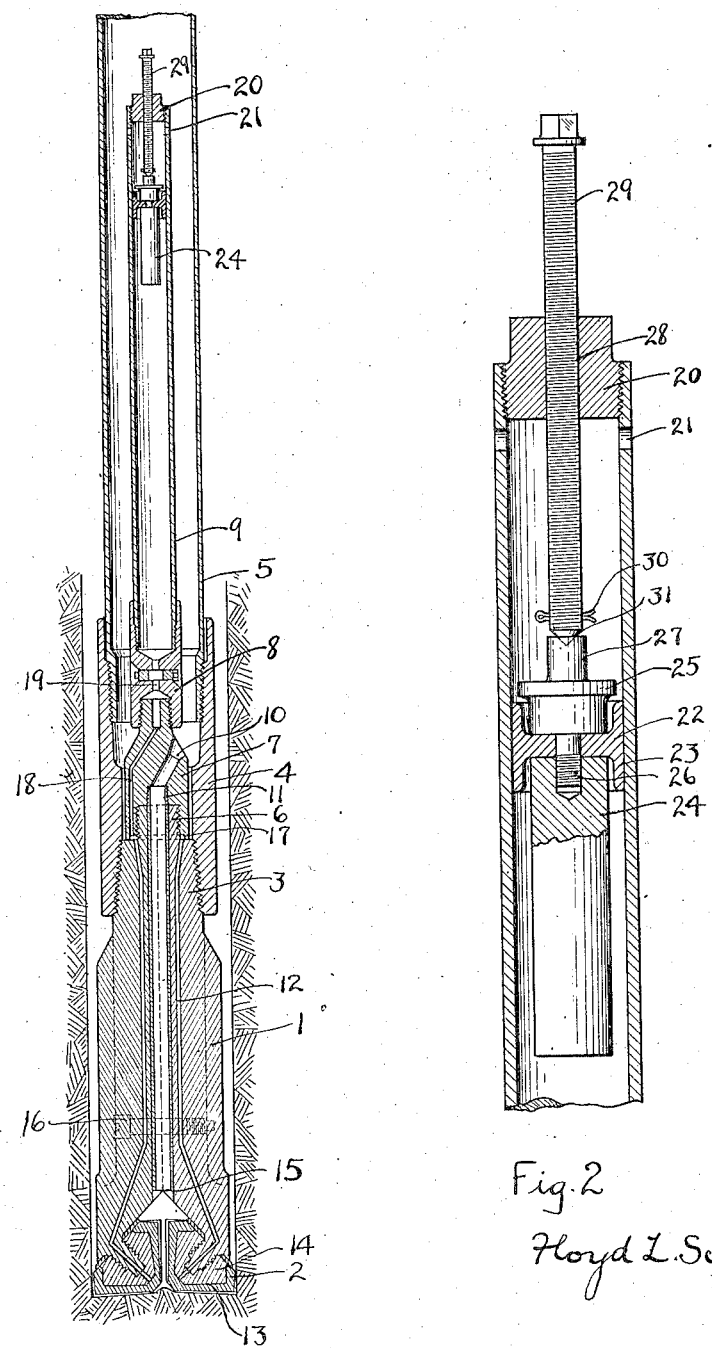

March 9, 1926.

F. L. SCOTT

LUBRICATOR

Filed Oct. 6, 1922

1,576,370

Floyd L. Scott, Inventor

By Jesse R. Stone

Attorney

Patented Mar. 9, 1926.

1,576,370

UNITED STATES PATENT OFFICE.

FLOYD L. SCOTT, OF HOUSTON, TEXAS, ASSIGNOR TO HUGHES TOOL COMPANY, OF HOUSTON, TEXAS, A CORPORATION OF TEXAS.

LUBRICATOR.

Application filed October 6, 1922. Serial No. 592,700.

*To all whom it may concern:*

Be it known that I, FLOYD L. SCOTT, a citizen of the United States, residing at Houston, Harris County, Texas, have invented a certain new and useful Improvement in Lubricators, of which the following is a full, clear, and exact description, such as will enable others skilled in the art to which it appertains to make and use the same.

My invention relates to attachments for lubricators used particularly in deep well drilling.

An object of the invention is to provide means to force from the lubricator such bubbles of air or gas as may be therein and to place the lubricant under pressure so as to fill the passages in the tool with lubricant before the drill is inserted into the well. Stated in another way the object is to completely fill the lubricator below the plunger, and the channels and openings connected therewith, with lubricant so that the back pressure of flushing fluid in the hole will not tend to force said fluid into the bearings of the cutters or into the lubricant channels.

I contemplate applying my invention to the usual type of lubricator now employed upon earth boring drills used for deep well drilling. This type of lubricator comprises a barrel secured to the upper end of the head of the drill and connected by means of oil ducts to bearings of the cutters on the forward end of the drill. The lubricant is forced from the lubricator barrel to the bearings of the cutters by the pressure of flushing fluid on the upper surface of said lubricant. The flushing fluid acts also to wash away the cuttings from the drill and carry them upwardly in suspension to the surface of the ground. In assembling the lubricator upon the bit, it is customary to fill the lubricator barrel with lubricant and to place a plunger on the upper surface of the lubricant and to close the upper end of the lubricator barrel with a perforated cap, whereby the flushing fluid may enter through the perforations and exert a pressure upon the plunger. The lubricator is then attached to the head of the drill and the device is inserted downwardly into the well The well is usually filled with fluid, ordinarily a fairly thick mud and exerts a pressure up through the bearings of the cutters and the oil ducts against the lubricant in the barrel There is usually found to be bubbles or pockets of air or gas in the oil, and the result is that the excess of pressure at the bearings is sufficient to compress the air or gas and allow the bearings and lower oil ducts to be completely filled with mud.

To overcome this difficulty I contemplate the provision of a means to force the air and gas from the lubricant before the bit is inserted into the well.

Referring to the drawings herewith Fig. 1 is a central longitudinal section through a drill and drill stem showing my improvement attached to the lubricator on said drill. Fig. 2 is an enlarged view of the attachment.

I have shown in the drawing a common type of roller drill having a head 1 provided with two forward rolling cutters 2. The head is approximately cylindrical and has an upper tapered shank 3 threaded for connection by means of a drill collar 4 to a drill stem 5. The upper end of the head is also formed with a reduced threaded nipple 6 to which is connected a special lubricator collar 7. This collar is threaded at its upper end and connected by means of a coupling 8 to the lubricator barrel 9. The lubricator collar 7 is formed with inclined passages 10 connecting the space within the drill stem with the upper end of a short length of pipe 11 inserted downwardly through the central portion of the head 1 of the drill and discharging at its lower end directly above the cutters.

The head is also formed with a plurality of longitudinal channels 12 leading from the lubricator and connected at their lower ends thereof with the bearings of the cutters. It will be noted that the bearing surface 13 is in this instance an approximately conical surface of the bushing 14 upon which the cutter 2 may rotate. The head of the drill is divided longitudinally along the line 15 and the two sides of the head are held together by means of transverse pins or bolts 16. The upper ends of the oil ducts 12 connect with an annular channel 17 formed in the lower surface of the lubricator collar 7. From this channel 17, a lubricator passage 18 connects with the upper nipple on the lubricator collar and through the valve controlled passage 19 with the interior of the lubricator barrel 9

The upper end of the lubricator barrel is internally threaded to receive a nut 20. Immediately below this nut the side walls of the lubricator barrel are perforated at 21 to allow the entrance of flushing fluid. Below the said openings 21 is a plunger 22, formed in any approved manner. I have shown a cup 23 of compressible material having a small weight 24 on the lower side thereof to guide the plunger. The cup is clamped between this weight and an upper enlarged head 25 of a clamping pin 26 which is threaded into the upper end of the weight as shown. The upper end of the head 25 of this pin is reduced in diameter and extended upwardly at 27 and formed with a tapered recess at the upper end thereof.

To exert pressure upon the plunger when the lubricator has been filled with oil I form a threaded opening 28 in the nut 20. The threaded shaft 29 is adapted to be screwed into said opening and may be held against removal therefrom by means of a cotter pin 30 or other similar means. The lower end of the shaft is tapered at 31 to fit within the recess in the upper end of the plunger. The upper end of said shaft is squared to receive a wrench by means of which it may be rotated.

In the use of my device I fill the lubricator barrel with lubricant in the usual manner, the lower passage 19 in the collar 8 being closed by the valve. The plunger is then inserted on top of the lubricant and the cap 20 is screwed into the barrel above the plunger. Previous to the insertion of the nut 20 the shaft 29 is screwed through the plug so that the lower end projects into the lubricator, and the cotter pin 30 is inserted through the shaft. The lubricator thus assembled is screwed on to the upper end of the lubricator collar on the drill, and the valve in the passage 19 is opened. In this condition there will be some air included in the lubricator chamber and the ducts 18 and 12, and also the bearings of the cutters will be dry and will contain a certain amount of air. The slight opening between the sides of the split head will be in connection with the channel 17 around the lower end of the lubricator collar, and if the said passages and oil ducts are not filled with lubricant the flushing water and mud will tend to force itself upwardly around the bearings and into the oil passages as previously described. To prevent this I force the plunger downwardly in the lubricator barrel by means of the threaded shaft 29. It will be noted that a heavy pressure may thus be exerted upon the lubricant and the air bubbles and any entrapped air or gas will be forced from the lubricator chamber and the oil passages in the lubricator collar and the bit will be filled with the the heavy lubricant. This lubricant will also fill the bearing surfaces 13 around the cutters and when the air has been entirely driven out of the tool oil will flow around the outer edges of the cutter bearings and become visible.

In this condition the drill may be secured to the drill stem and the assembled device inserted into the well, and owing to the fact that the lubricant is still under pressure from the shaft 29 and the plunger, it will be practically impossible for flushing fluid to be driven upwardly against this pressure exerted upon the upper surface of the lubricant. By this means no sand or grit will be driven into the bearings and the operation of the drill will continue to feed the clean lubricant to the bearings when the drill is in use. The further objects and advantages of this device will be apparent to the one skilled in the art.

What I claim is:

1. In a device of the character described, a drill head, roller cutters thereon, said head having a central water channel and also oil ducts connecting the bearings of said cutters with the upper end of said head, a lubricator barrel on said head connected with said ducts, a plunger on the lubricant in said barrel, a cap closing the upper end of said barrel, a shaft having threaded engagement through said cap and adapted to bear on said plunger, whereby the advancing of said shaft will force the plunger downwardly for a short distance and compress said lubricant, preliminary to inserting the drill in the well.

2. In an earth boring drill comprising a head having a water channel therethrough, roller cutters on said head, and a lubricator barrel on said head having connections with the bearings of said cutters, the combination of a cap closing the upper end of said lubricator barrel, a plunger below said cap, a shaft threaded through said cap and bearing on said plunger when said plunger is near the said cap whereby the shaft may be advanced for a limited distance to force the plunger downwardly on the lubricant and force it into said drill head and cutter bearings.

3. In an earth boring drill comprising a head, roller cutters thereon, a water channel through said head, and a lubricator barrel having connections with the bearings of said cutters, the combination of a plunger on the lubricant in said barrel, said barrel having openings above said plunger to allow pressure of flushing fluid to bear on said plunger and additional means connected with said barrel to advance said plunger positively downward a limited distance against said lubricant designed to be manually operated preliminary to introducing the drill into the well.

In testimony whereof, I hereunto affix my signature, this the 22nd day of September, A. D., 1922.

FLOYD L. SCOTT.